United States Patent
Fuse

(10) Patent No.: US 7,441,396 B2
(45) Date of Patent: Oct. 28, 2008

(54) MANUFACTURE METHOD OF POWER TRANSMISSION CHAIN AND PIN-RETAINER JIG

(75) Inventor: Masaru Fuse, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 11/663,170

(22) PCT Filed: Sep. 30, 2005

(86) PCT No.: PCT/JP2005/018166

§ 371 (c)(1),
(2), (4) Date: Mar. 19, 2007

(87) PCT Pub. No.: WO2006/035942

PCT Pub. Date: Apr. 6, 2006

(65) Prior Publication Data

US 2007/0289284 A1    Dec. 20, 2007

(30) Foreign Application Priority Data

Sep. 30, 2004    (JP)    ............................... 2004-286950

(51) Int. Cl.
*B21L 9/06* (2006.01)
*F16G 13/06* (2006.01)

(52) U.S. Cl. ............................ 59/7; 59/35.1; 474/229; 29/251

(58) Field of Classification Search ............. 59/7, 59/35.1; 474/229; 29/251
See application file for complete search history.

(56) References Cited

U.S. PATENT DOCUMENTS

| 2,831,316 | A | * | 4/1958 | Linde, Jr. | 59/7 |
| 3,802,184 | A | * | 4/1974 | Brown et al. | 59/7 |
| 3,866,410 | A | * | 2/1975 | Zwinge | 59/7 |
| 4,878,345 | A | * | 11/1989 | Bechtold | 59/35.1 |
| 7,140,173 | B2 | * | 11/2006 | Van Rooij | 29/251 |
| 2003/0056489 | A1 | | 3/2003 | Bekiroglu | |

FOREIGN PATENT DOCUMENTS

| JP | 49-13774 A | 2/1974 |
| JP | 2851063 B2 | 11/1998 |
| JP | 2004-502548 A | 1/2004 |

* cited by examiner

*Primary Examiner*—David B Jones
(74) *Attorney, Agent, or Firm*—Birch, Stewart, Kolasch & Birch, LLP

(57) ABSTRACT

A method of manufacturing of power transmission chain 1 by interconnecting plural link plates 2 with pins 3. Individual pin pairs 3 are arranged and temporarily fixed to places. The link plates 2 are sequentially stacked in layers by press-fitting respective through-holes 4 of the link plates 2 about the respective pin pairs 3, whereby the link plates 2 are interconnected to form a circular chain (an endless loop). Subsequently, the individual pin pairs 3 are released from the temporarily fixed state. Thus, the manufacture of the power transmission chain 1 is decreased in the number of operation steps, so that the chain may be assembled easily.

11 Claims, 5 Drawing Sheets

MANUFACTURE METHOD OF POWER TRANSMISSION CHAIN AND PIN-RETAINER JIG

TECHNICAL FIELD

The present invention relates to a manufacture method of a power transmission chain for a continuously variable transmission or the like employed by vehicles or the like, and to a pin-retainer jig used in the manufacture method.

BACKGROUND ART

The power transmission chain for use in the continuously variable transmission (CVT) for automotive vehicles includes, for example, an endless type which is entrained between a drive pulley on an engine side and a driven pulley on drive wheel side. The continuously variable transmission transmits a great power by way of contact between sheave surfaces of the respective pulleys and end faces of pins of the power transmission chain under boundary lubrication. Furthermore, the continuously variable transmission is adapted to accomplish continuous gear shifting by continuously varying a respective groove width of the pulleys.

The above power transmission chain includes one which is manufactured by a method wherein a plurality of link plates formed with through-holes are stacked in layers and the pins are inserted through the through-holes placed in intercommunicating relation for interconnecting the link plates by way of fit-engagement between the pins and the link plates. In this case, the manufacture of the power transmission chain requires quite a labor-intensive operation because the chain must be fabricated as ensuring the fit-engagement between the link plates and the pins.

In this connection, a method facilitating the assembly of the power transmission chain is disclosed in Patent Gazette No. 2851063. According to this method, a large number of link plates are arranged in overlapping relation. Subsequently, one set of overlapped link plates are clamped between two extrusion pins each formed with projection(s) and depression(s) at a distal end thereof and the link plates are mutually shifted to conform to the projection(s) and depression(s). The pins are inserted through the link plates in this state. This procedure is repeated to interconnect the link plates into a straight chain. Finally, opposite ends of the link plate chain are combined with each other.

However, the above assembly method of power transmission chain requires the step of combining the opposite ends of the link plate chain. In the case of a power transmission chain having a specific pin configuration or a specific configuration of the through-hole of the link plate, the assembly method requires a special component for the combining portion or requires complicated operations such as to align the through-holes of the link plates with the corresponding pins. This takes quite a large quantity of time and labor.

In view of the foregoing, it is an object of the invention to provide a manufacture method of power transmission chain which includes a decreased number of steps and provides an easy assembly of the chain.

DISCLOSURE OF THE INVENTION

The invention adopts the following technical measure to achieve the above object.

Specifically, the invention is characterized in that the interconnection of a plurality of link plates is accomplished by the steps of: arranging a plurality of pins at a predetermined pitch and retaining the pins in an endless loop form; forming an endless loop chain by sequentially stacking the plural link plates in layers as inserting the individual pins through through-holes of the link plates; and releasing the individual pins from the retained state.

The above invention provides the manufacture method wherein the plural link plates are interconnected with the pins to form the endless loop and subsequently, the pins are released from the retained state. At the time when the pins are released from the retained state, therefore, the interconnection of the link plates in the endless loop form is accomplished. Unlike the conventional method, this manufacture method does not require the complicated operation to combine the opposite ends of the linear chain of the interconnected link plates. This negates the need for the special component for combining the opposite ends of the link-plate chain or the complicated operation such as to align the through-holes of the link plates at the opposite ends of the link-plate chain with the corresponding pins. Thus, a notable reduction of the number of operation steps may be achieved so that the chain may be assembled easily.

According to the above invention, it is preferred that the endless loop extends in a circular form. In this case, the link plates are assembled in a manner to form the circular loop. Hence, a chain (completed product) entrained between the pulleys involves less collision between the link plates at a bent portion thereof, so that the chain may be more smoothly revolved between the pulleys.

In a case where the pins are press-inserted through the through-holes of the plural link plates for interconnecting the link plates by way of fit-engagement between the pins and the link plates, a fit-engagement margin (press-insertion margin) is provided between the link plate (through-hole) and the pin. Because of the fit-engagement margin, the conventional technique suffers the following problem. When pins 31 are press-inserted through link plates 30, as shown in FIGS. 5(a) and (b), the link plate 30 is vertically (as seen in FIG. 5 (b)) stretched at its portion where the pins 31 are press-inserted while on the other hand, the link plate 30 shrinks transversely at its portion between two through-holes 32 thereof. This causes a phenomenon where the pins 31 draw each other so that a respective side surface of the pins 31 is pressed toward a respective inside surface of the through-holes 32 and the pins are gradually inclined. The inclined pins 31 make it difficult to assemble the link plates 30, resulting in a decreased efficiency of the assembling operation.

As a solution, the invention provides a constitution wherein the length of a loop defined by a line consecutively interconnecting the adjoining pins in the retained state is decreased enough from the length of a loop defined by a line consecutively interconnecting the adjoining pins released from the temporarily fixed state to ensure that the pins do not obstruct the assembling of the link plates.

In this manner, an allowable margin may be previously provided between the side surface of the pin and the inside surface of the through-hole such as to prevent the fit-engagement margin from causing the pin to be pressed toward the inside surface of the through-hole at its side surface. Accordingly, the pins may be prevented from being inclined when the link plates are sequentially press-fitted thereabout. This leads to an easy assembly of the link plates so that the assembling operation may be increased in efficiency.

Further, in the case where the endless loop constituted by the link plates extends in the circular form, the PCD of a circle defined by a line consecutively interconnecting the adjoining pins in the retained state may be decreased from the PCD of a circle defined by a line consecutively interconnecting the adjoining pins released from the temporarily fixed state by 0.05% to 0.5% of the latter PCD.

In this case, as well, the allowable margin may be previously provided between the side surface of the pin and the inside surface of the through-hole such as to prevent the fit-engagement margin from causing the pin to be pressed toward the inside surface of the through-hole at its side surface. Accordingly, the pins may be prevented from being inclined when the link plates are sequentially press-fitted thereabout.

According to the invention, a pin-retainer jig for use in the manufacture of a power transmission chain in which a plurality of link plates formed with through-holes are stacked in layers and pins are press-inserted through the through-holes placed in intercommunicating relation, thereby interconnecting the plural link plates by way of fit-engagement between the pin and the link plate, the pin-retainer jig is designed to retain the pins arranged at a predetermined pitch and in an endless loop form.

Such a pin-retainer jig is adapted to retain the pins in the endless loop arrangement, thus offering high convenience as applied to the manufacture method of the invention.

BEST MODE FOR CARRYING OUT THE INVENTION

Figure 2A:
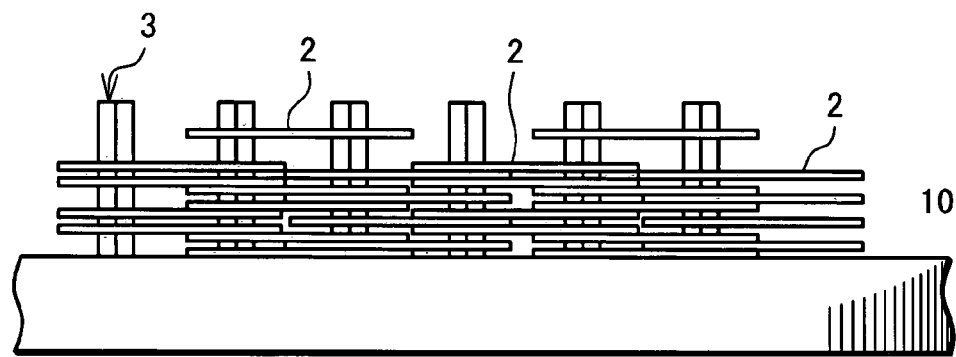
FIG. 2(a) is an enlarged side view showing how the link plates are stacked in layers, (b) showing in plan a (completed) power transmission chain with the pins released from the temporarily fixed state.
Figure 2B:
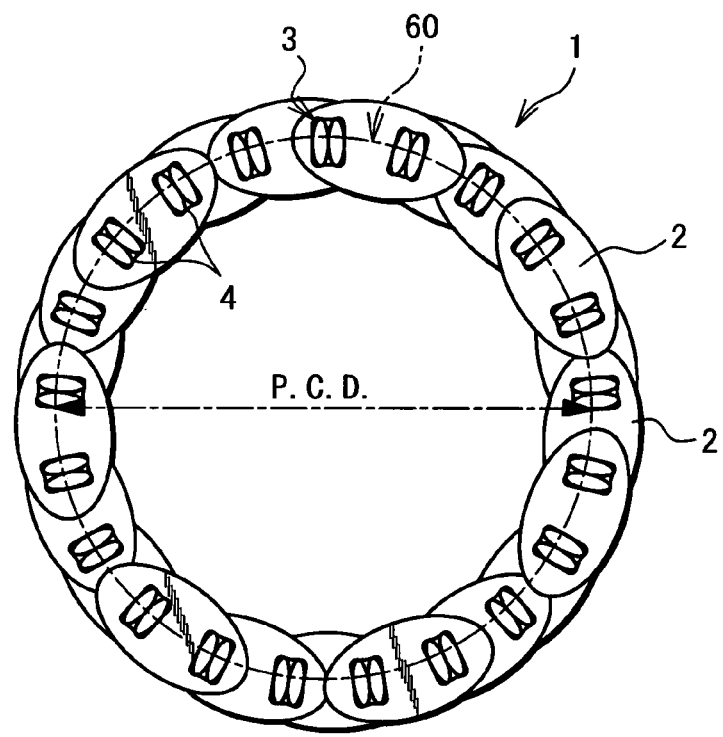
Figure 5A:
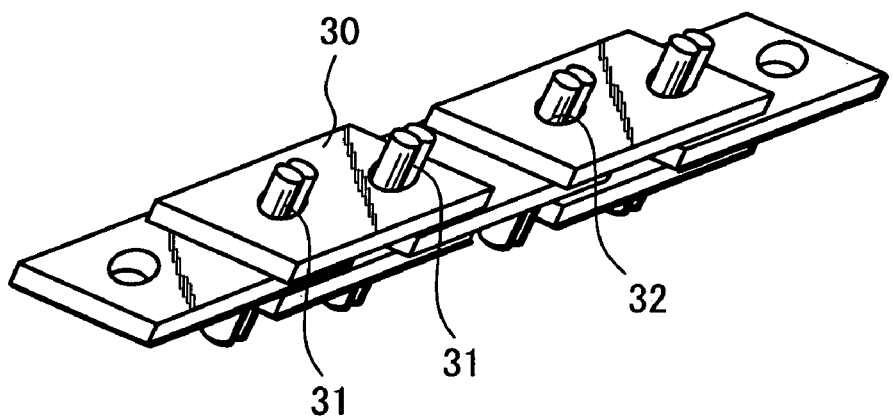
FIG. 5(a) is a perspective view showing how link plates of a conventional power transmission chain are sequentially stacked in layers, (b) showing in plan one of the link plates of (a).
Figure 5B:
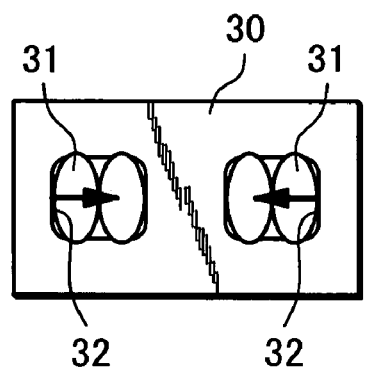

One embodiment of the invention will hereinbelow be described with reference to the accompanying drawings. As shown in FIG. 2(b), a power transmission chain 1 (hereinafter, referred to as "chain") according to the embodiment is in an endless form and includes a plurality of link plates 2 formed from a metal (such as a bearing steel); and a plurality of pins 3 formed from a metal (such as a bearing steel) and arranged in pairs for interconnecting these link plates 2. The chain 1 is used, for example, in a continuously variable transmission of an automotive vehicle. The chain is used as entrained between a drive pulley 20 and a driven pulley 30, as shown in FIG. 5.

The link plate 2 is an elliptical plate material and is formed with two through-holes 4 (a first through-hole, a second through-hole). Each pair of pins 3 are press-inserted through each through-hole 4. The link plates 2 are stacked in layers in a thicknesswise direction of the chain 1 as mutually overlapped in parallel. The link plates 2 are arranged with one-column spacing so as to be interconnected as shifted by one through-hole. These link plates 2 are interconnected by way of fit-engagement between the link plates 2 and the pins 3 inserted through the through-holes 4 of the link plates.

Figure 3:
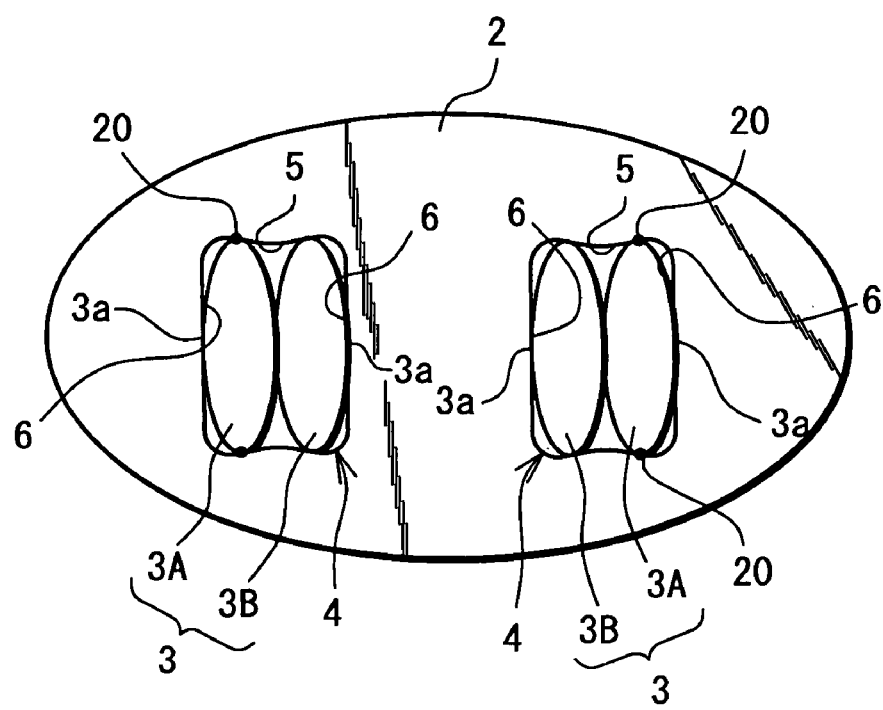
FIG. 3 is a plan view showing a link plate having the pins press-inserted through a through-hole thereof.
Figure 4:
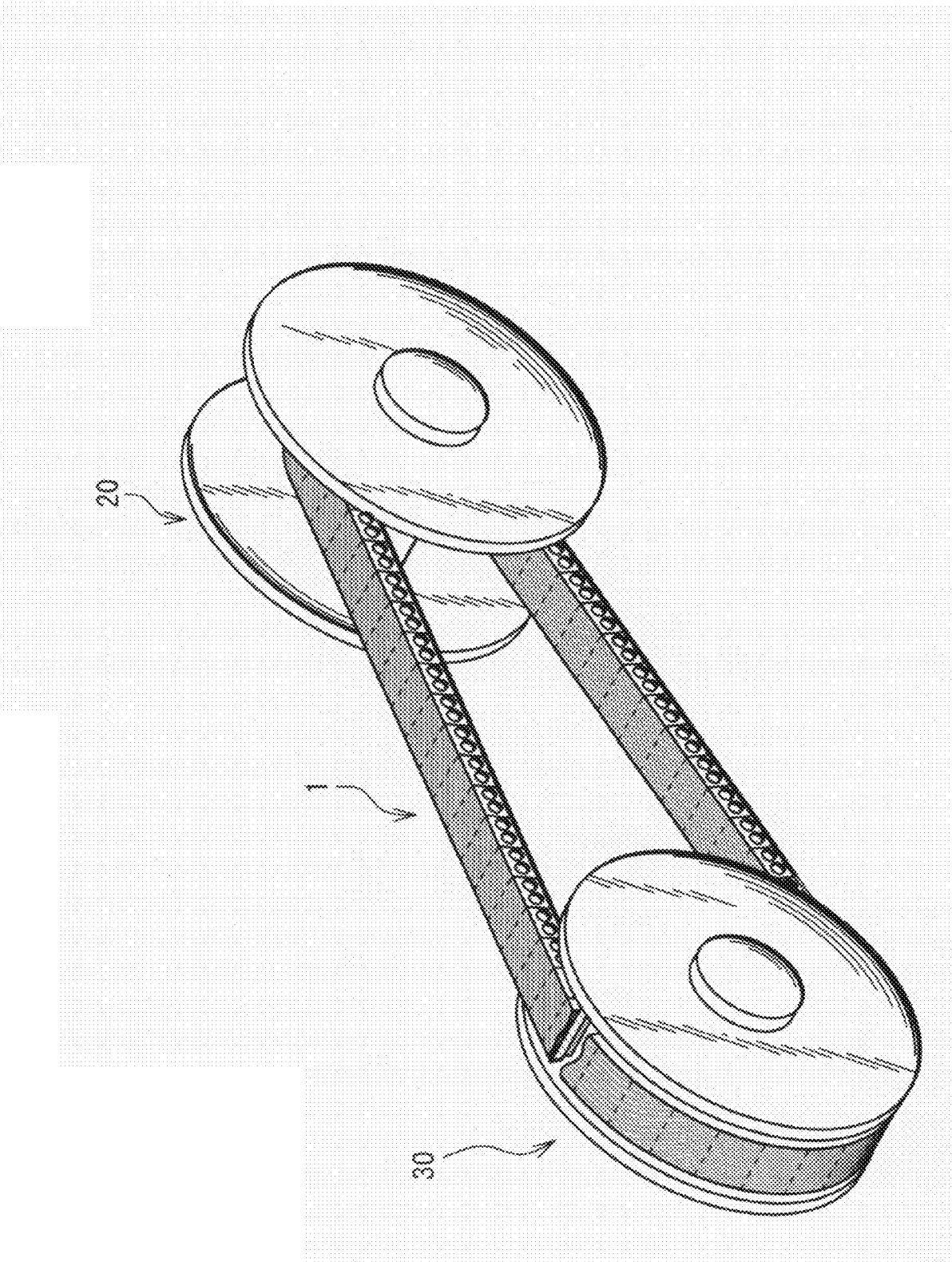
FIG. 4 is a perspective view showing the power transmission chain entrained between a drive pulley and a driven pulley of an automotive vehicle.

As shown in FIG. 3, the two through-holes 4 (the first through-hole, the second through-hole) formed in the link plate 2 each have a substantially rectangular shape, a longitudinal side of which extends in a widthwise direction (the vertical direction as seen in FIG. 3) of the link plate 2. Each of the through-holes 4 has four curved corners, an upper and a lower shorter inside surface 5 slightly centrally protruded as seen in FIG. 3, and a right-hand and a left-hand longitudinal inside surface 6 linearly extended as seen in FIG. 3. The pin. 3 includes a first pin 3A and a second pin 3B inserted through the through-hole 4 (in FIG. 3, a respective one of the pin pairs in the through-holes 4, 4 which is closer to the circumferential edge of the link plate is defined as the first pin 3A, whereas a respective one of the pin pairs 4, 4 which is closer to the center of the link plate is defined as the second pin 3B). The first and second pins 3A, 3B are each constituted by a bar-like member formed from a metal (such as a bearing steel) and having a predetermined length.

In each through-hole 4, only the first pin 3A of the first and second pins 3A, 3B is press-inserted so as to be fixed therein. That is, the first pin 3A fixedly press-inserted through one through-hole of one link plate 2 is un-fixedly press-inserted through another through-hole of another link plate to serve as the second pin 3B. The first pins 3A are fit-engaged with the link plates 2 at upper and lower apexes 20, 20 thereof with respect to the vertical direction as seen in FIG. 3, whereby the link plates 2 are interconnected. The first and second pins 3A, 3B each have a side surface 3a in contact with a corresponding longitudinal inside surface 6 of the through-hole 4. Only the side surface 3a of the un-fixed second pin 3B is circumferentially slidable relative to the link plate 2.

Then, the first pin 3A and the second pin 3B inserted through the same through-hole 4 (the first trough-hole or the second through-hole) are brought into relative movement in rolling contact, thereby permitting the chain 1 to bend longitudinally. The following approaches may be taken to reduce wear or sliding resistance of the first and second pins 3A, 3B at the side surfaces 3a thereof and at their portions in sliding contact or rolling contact with an inside surface 4a of the through-hole 4. A solid lubricant such as molybdenum sulfide or fluorine may be applied to the side surfaces and such portions of the pins. Alternatively, the side surfaces and such portions of the first and second pins may be roughened by shot-peening or barrel finishing so as to be formed with dents to hold the lubricant. The configurations of the first and second pins 3A, 3B and of the through-hole 4 are not limited to those of the embodiment. A constitution may be made such that a pin and a strip having different configurations are inserted through one through-hole, or such that three or more pins are inserted through one through-hole. In addition, the first and second through-holes 4, 4 may have different configurations or may be communicated with each other to define a single through-hole.

Figure 1A:
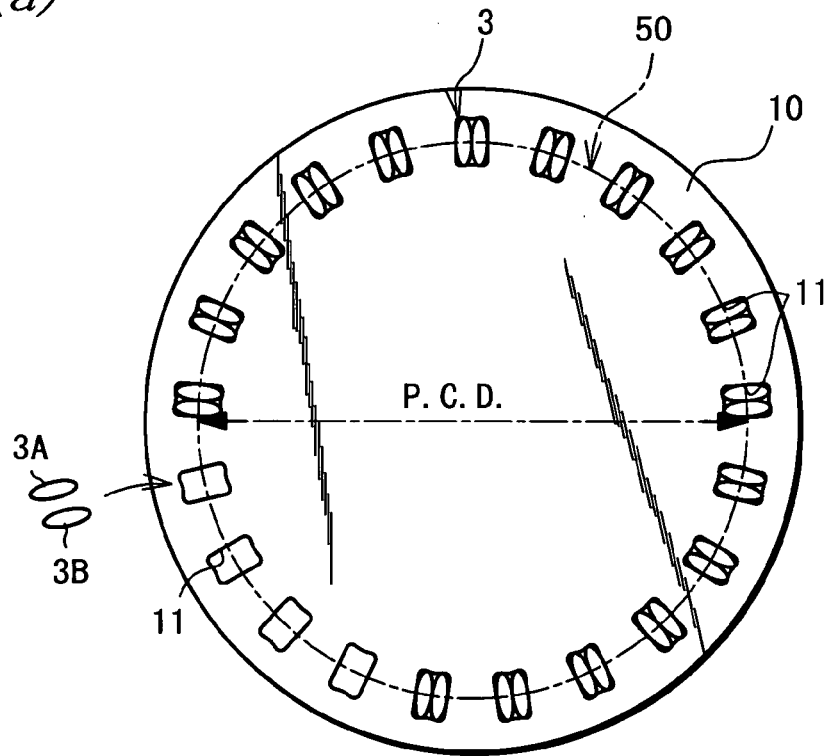
FIG. 1(a) is a plan view showing pins temporarily fixed on a chain assembling die, (b) showing in plan a state where link plates with the pins inserted therethrough are sequentially stacked in layers.
Figure 1B:
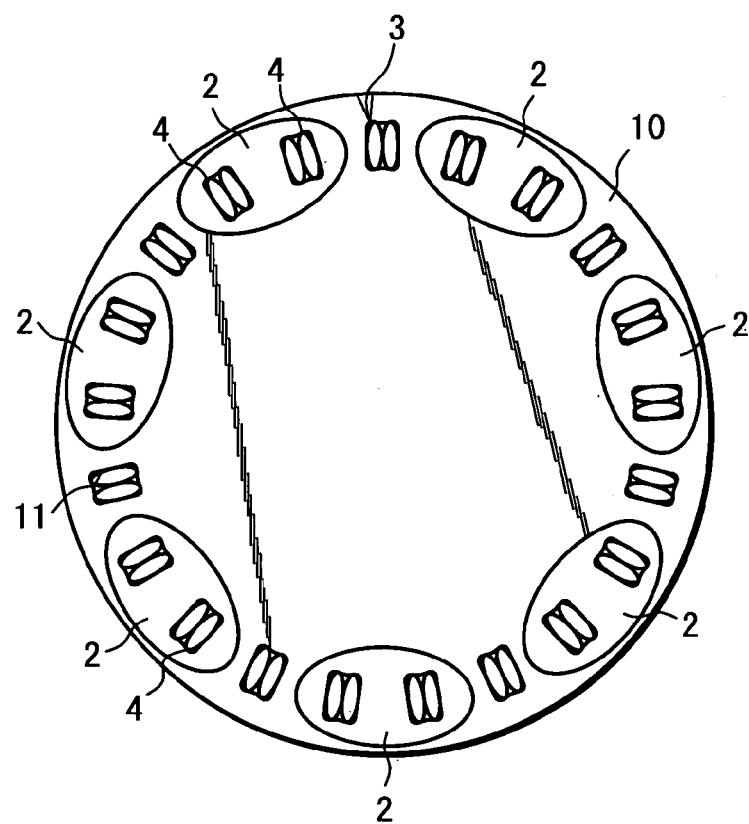

Next, description is made on a manufacture method of the above chain 1. The embodiment uses a chain assembling die 10 (pin-retainer jig) for previously retaining individual pin pairs 3 in a circular arrangement (endless loop arrangement), as shown in FIG. 1(a). The assembling die 10 is shaped like a disk and is circumferentially formed with a plurality of temporary fixing portions 11 to hold the pins 3. The temporary fixing portions 11 are formed at a predetermined pitch along the circumferential direction of the die. The temporary fixing portion 11 has substantially the same configuration as that of the through-hole 4 of the link plate 2 and is so dimensioned as to hold the pins 3 (the dimensions are suitably changeable in the range between those permitting the press-insertion of the pins and those permitting the clearance-fit of the pins). One temporary fixing portion 11 holds a pair of pins 3 (the first and second pins 3A, 3B) in an upright position. Accordingly, individual pairs of first and second pins 3A, 3B are arranged along the circumference of the chain assembling die 10 at the same pitch as that of the temporary fixing portions 11. Subsequently, the two through-holes 4 of each link plate 2 are press-fitted about the respective pin pairs in turn, whereby the link plates 2 are stacked in layers on the chain assembling die 10, as shown in FIG. 1(b) and FIG. 2(a).

In this manner, a required number of link plates 2 are stacked in layers on the chain assembling die 10 and are interconnected to form a circular chain (the endless loop). Subsequently, all the pins 3 (the first and second pins 3A, 3B) are released from the state retained by the chain assembling die 10. Thus is completed the power transmission chain 1 shown in FIG. 2(b). That is, the manufacture method is constituted to release the pins 3 from the retained state after a closed curve is formed by interconnecting the link plates 2. At the time when the pins 3 are released from the retained state, therefore, the link plates 2 are interconnected in the endless loop form to provide the power transmission chain 1. Unlike the conventional method, the manufacture method of the invention does not require the complicated operation to combine the opposite ends of the linear chain of the interconnected link plates. This negates the need for a special component for combining the opposite ends of the link-plate chain or the complicated operation such as to align the through-holes of the link plates at the opposite ends of the link-plate chain with the corresponding pins.

Particularly, the press-insertion chain such as of the embodiment, which is formed by stacking plural link plates 2 in layers (particularly, six or more) and fixing these link plates by press-inserting the pins therethrough, is relatively hard to bend so that it is more difficult to overlap the opposite ends of the chain on each other. Hence, the omission of such operations offers a great advantage. Thus, a notable reduction of the number of operation steps may be achieved so that the chain may be assembled easily. What is more, the link plates 2 are assembled in a manner to form the circular loop and hence, the chain 1 entrained between the pulleys 20, 30 involves less collision between the link plates 2 at a bent portion thereof. As assembled in the continuously variable transmission, the chain 1 may be more smoothly revolved between the pulleys 20, 30.

A circle 50 (closed curve) defined by a line consecutively interconnecting adjoining pin pairs 3 in the retained state has a PCD (FIG. 1) which is decreased from a PCD of a circle 60 defined by a line consecutively interconnecting adjoining pin pairs released from the retained state by preferably 0.05 to 0.5% or more preferably by 0.1 to 0.3% of the latter PCD. The chain of the embodiment has a PCD (defined by the chain released from the temporarily fixed state) of 200 mm. Hence, the PCD of the circle 50 constituted by the temporarily fixed pins is designed to be in the range of 199.0 to 199.9 mm which is 0.1 to 1.0 mm (0.05 to 0.5%) smaller than 200 mm. Because of the fit-engagement between the first pins 3A and the link plate 2, the link plate 2 is stretched at its portions where the first pins 3A penetrate, while on the other hand, the link plate shrinks at its portion between the first and second through-holes 4. The PCD of the above circle 50 is defined in consideration of the dimensional decrease of the individual link plates 2. Namely, the individual pins 3 are previously located based on the dimensional decrease and retained by the temporary fixing portions 11.

As described above, the link plates 2 are interconnected by way of the fit-engagement between the through-hole 4 of the link plate 2 and the respective apexes 20 of the first pin 3A.

Hence, there is provided a fit-engagement margin (press-insertion margin) between the shorter inside surface 5 of the through-hole 4 and the apex 20 of the first pin 3A. As described above, the PCD defined by the temporarily fixed pin pairs 3 is decreased from the PCD defined by the pin pairs released from the temporarily fixed state by the required quantity, whereby an allowable margin may be previously provided between the side surface 3a of the pin 3 and the longitudinal inside surface 6 of the through-hole 4 such as to prevent the side surface 3a of the pin 3 press-inserted through the through-hole 4 from being pressed toward the longitudinal inside surface 6 of the through-hole 4. Hence, the side surface 3a of the first pin 3A is not pressed toward the longitudinal inside surface 6 of the through-hole 4 when the first pin is press-inserted through the through-hole 4 (the link plate 2).

If a difference between the PCD in the temporarily fixed state and the PCD after the release from the temporarily fixed state is less than 0.05%, the side surface 3a of the first pin 3A is pressed toward the longitudinal inside surface 6 of the through-hole 4, so that the pin pair 3 (the first and second pins 3A,3B) is inclined inwardly (toward the center of the link plate). (That is, the link plate 2 causes the pin pairs 3 to draw each other). If a difference between the PCD in the temporarily fixed state and the PCD after the release from the temporarily fixed state is more than 0.5%, on the other hand, the side surface 3a of the second pin 3B in contact with the longitudinal inside surface 6 is pressed toward the longitudinal inside surface 6, so that the pin pair 3 (the first and second pins 3A, 3B) is inclined outwardly (toward the circumference of the link plate). (That is, the link plate 2 causes the pin pairs 3 to move away from each other). Therefore, if the difference between the PCD in the temporarily fixed state and the PCD after the release from the temporarily fixed state is out of the range from 0.05% to 0.5%, it is difficult to assemble the link plates 2 and the assembling operation is decreased in efficiency.

In this manner, the allowable margin is provided between the side surface 3a of the pin 3 and the longitudinal inside surface 6 of the through-hole 4. When the link plates 2 are sequentially press-fitted about the pins 3, therefore, the link plates 2 do not cause the pin pairs 3 to draw each other or move away from each other. Thus, is obviated the inclination of the pins 3. This leads to the easy assembling of the link plates 2 and the increased efficiency of the assembling operation. While the embodiment arranges the respective pin pairs 3 to be retained in the circular form, the pin arrangement is not limited to this. The pins may be arranged in an elliptical form or a square form. Furthermore, the number of link plates 2 stacked in layers, the PCD of the chain 1, the pin configuration or the number of the pins 3 and the like may be properly varied according to the specifications of the chain. The aforementioned chain assembling die 10 (pin-retainer jig) may be set to direct its pin holding surface horizontally or vertically according to the conditions of a factory workshop.

What is claimed is:

1. A manufacture method of power transmission chain which accomplishes the interconnection of a plurality of link plates, the method comprising the steps of:

arranging a plurality of pins at a predetermined pitch and retaining the pins in an endless loop form;

forming an endless loop chain by sequentially stacking the link plates in layers such that a pair of the pins inserts through a corresponding one of through-holes of a corresponding one of the link plates, wherein the stacking step is performed such that after stacking the corresponding one of the link plates to the pair of the pins, one of the pair of the pins is slidable relative to the corresponding one of the link plates; and releasing the individual pins from a retained state.

2. The manufacture method according to claim 1, wherein the endless loop extends in a circular form.

3. The manufacture method according to claim 2, wherein the pins are press-inserted through the through-holes of the plural link plates for interconnecting the link plates by way of fit-engagement between the pins and the link plates, and wherein a PCD of a circle defined by a line consecutively interconnecting the pins in the retained state is decreased from the PCD of the circle released from a temporarily fixed state by 0.05% to 0.5%.

4. The manufacture method according to claim 2, wherein the pins are press-inserted through the through-holes of the link plates for interconnecting the link plates by way of fit-engagement between the pins and the link plates, and wherein a first length of a loop defined by a line consecutively interconnecting the pins in the retained state is decreased enough from the length of the loop defined released from a temporarily fixed state to ensure that the pins do not obstruct assembling of the link plates.

5. The manufacture method according to claim 1, wherein the pins are press-inserted through the through-holes of the link plates for interconnecting the link plates by way of fit-engagement between the pins and the link plates, and wherein a length of a loop defined by a line consecutively interconnecting the pins in the retained state is decreased enough from the length of the loop released from a temporarily fixed state to ensure that the pins do not obstruct assembling of the link plates.

6. The manufacture method according to claim 1, wherein the one of the pair of the pins farther than the other one of the pair of the pins to a nearest end of the corresponding one of the link plates in a length direction of the corresponding one of the link plates is slidable relative to the corresponding one of the link plates.

7. The manufacture method according to claim 6, wherein the stacking step is performed such that after stacking the corresponding one of the link plate to the pair of the pins, the other one of the pair of the pins is non-slidable relative to the corresponding one of the link plates.

8. The manufacture method according to claim 6, wherein the stacking step is performed such that after another link plate immediately next to the corresponding one of the link plates is stacked to the pair of the pins, the one of the pair of the pins is non-slidable relative to the link plate immediately next to the corresponding one of the link plates.

9. The manufacture method according to claim 8, wherein the stacking step is performed such that after the link plate immediately next to the corresponding one of the link plates is stacked to the pair of the pins, the other one of the pair of the pins is slidable relative to the link plate immediately next to the corresponding one of the link plates.

10. The manufacture method according to claim 1, further comprising forming the link plates by forming a top inner surface of each of the through-holes protruding downwardly and forming a bottom inner surface protruding upwardly toward the top inner surface.

11. A pin-retainer jig for use in the manufacture of a power transmission chain in which a plurality of link plates formed with through-holes are stacked in layers and pins are inserted through the through-holes placed in intercommunicating relation, thereby interconnecting the plural link plates, wherein the pin-retainer jig includes a plurality of retaining holes to retain the pins arranged at a predetermined pitch and in an endless loop form, and wherein each of the retaining holes has a top inner surface and a bottom surface inner surface, the top inner surface protruding downwardly and the bottom surface inner surface upwardly toward the top inner surface.

* * * * *